US012649402B2

(12) United States Patent
Sakurai

(10) Patent No.: US 12,649,402 B2
(45) Date of Patent: Jun. 9, 2026

(54) RETRACTABLE TABLE FOR VEHICLE

(71) Applicant: TOYOTA JIDOSHA KABUSHIKI KAISHA, Aichi-ken (JP)

(72) Inventor: Hideyuki Sakurai, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 305 days.

(21) Appl. No.: 18/413,025

(22) Filed: Jan. 16, 2024

(65) Prior Publication Data

US 2024/0246470 A1    Jul. 25, 2024

(30) Foreign Application Priority Data

Jan. 20, 2023    (JP) .................................. 2023-007030

(51) Int. Cl.
B60N 3/00          (2006.01)
(52) U.S. Cl.
CPC ..................................... B60N 3/001 (2013.01)
(58) Field of Classification Search
CPC ........................................ B60N 3/001
USPC ............................................. 108/44, 47, 48
See application file for complete search history.

(56) References Cited

U.S. PATENT DOCUMENTS

| | | | | | |
|---|---|---|---|---|---|
| 4,130,070 | A | * | 12/1978 | Herrin ................... | A47B 13/081 |
| | | | | | 108/143 |
| 6,349,962 | B1 | * | 2/2002 | Johanson ................... | B62B 3/02 |
| | | | | | 280/42 |

| | | | | | |
|---|---|---|---|---|---|
| 6,443,481 | B1 | * | 9/2002 | Stravitz ................... | A47B 31/04 |
| | | | | | 280/47.35 |
| 6,851,564 | B2 | * | 2/2005 | Ng .......................... | B62B 3/005 |
| | | | | | 108/171 |
| 7,258,384 | B2 | * | 8/2007 | Drabik .................... | B60P 1/435 |
| | | | | | 296/61 |
| 7,896,432 | B2 | * | 3/2011 | Dunkel ................... | B60N 3/001 |
| | | | | | 297/125 |
| 9,295,325 | B2 | * | 3/2016 | Luebke ................... | A47B 13/02 |
| 10,058,171 | B2 | * | 8/2018 | Deng ...................... | A47B 96/021 |
| D958,044 | S | * | 7/2022 | O'Hara ........................ | D12/400 |
| 11,718,215 | B2 | * | 8/2023 | Hebert ............... | B60N 2/42727 |
| | | | | | 108/44 |
| 11,779,106 | B2 | * | 10/2023 | O'Hara .............. | B64D 11/0605 |
| | | | | | 108/44 |
| 12,370,100 | B1 | * | 7/2025 | Slagerman ............... | A61G 5/08 |
| 12,384,439 | B2 | * | 8/2025 | Foster ..................... | B62B 3/005 |
| 12,465,142 | B2 | * | 11/2025 | Ke .......................... | B62B 3/002 |
| 2009/0249982 | A1 | * | 10/2009 | Palethorpe ............... | A47B 5/00 |
| | | | | | 108/44 |

(Continued)

FOREIGN PATENT DOCUMENTS

| | | |
|---|---|---|
| JP | H08-000361 A | 1/1996 |
| JP | 2021-062645 A | 4/2021 |

*Primary Examiner* — Daniel J Troy
*Assistant Examiner* — Timothy M Ayres
(74) *Attorney, Agent, or Firm* — HAUPTMAN HAM, LLP

(57)          ABSTRACT

A retractable table has a post link mechanism and a table plate mechanism. In a retracted state of the table, the post link mechanism is folded into a bellows shape in a plan view. In the retracted state, the table plate mechanism is folded, following the post link mechanism, in a bellows shape in a front view. In an expanded state of the table, the post link mechanism in the bellows shape is expanded in the plan view. In the expanded state, the table plate mechanism is horizontally expanded, following the post link mechanism.

6 Claims, 6 Drawing Sheets

(56)    References Cited

U.S. PATENT DOCUMENTS

2014/0338120 A1 * 11/2014 Baugh ................... A47B 83/04
                                                            5/3
2018/0289168 A1 * 10/2018 Stieglitz ................ A47B 83/00
2020/0023761 A1 *  1/2020 Nishimura .............. A47B 9/00

* cited by examiner

RETRACTABLE TABLE FOR VEHICLE

CROSS REFERENCE TO RELATED APPLICATION

This application claims priority to Japanese Patent Application No. 2023-007030, filed on Jan. 20, 2023, which is incorporated herein by reference in its entirety including the specification, claims, drawings, and abstract.

TECHNICAL FIELD

In this specification, a table provided in a vehicle is disclosed. This table is retractable.

BACKGROUND

For example, JP 8-361 A, JP 2021-62645 A discloses a retractable table. In JP 8-361 A, a flat plate serving as a table plate is disclosed. The flat plate is expanded from a vertical state (a retracted state) to a horizontal state.

In JP 2021-62645 A, a table apparatus is disclosed. A table device is disposed between a pair of left and right seats provided in the vehicle compartment. In this table device, the table plate is divided into a pair of flat plate portions. The pair of flat plate portions is expanded from a standing position (partition state) to a horizontal state.

A retractable table for vehicle is disclosed herein. This table can improve the storage performance as compared with the prior art.

SUMMARY

A retractable table for vehicle is disclosed herein. The table has a post link mechanism and a table plate mechanism. The post link mechanism includes a plurality of posts and a plurality of links. The table plate mechanism includes a plurality of plate pieces and a plurality of hinges. Each of the plurality of links connects a pair of posts in the plurality of posts. Each of the plurality of hinges connects a pair of plate pieces in the plurality of plate pieces. In a retracted state of the table, the post link mechanism is folded into a bellows shape in a plan view. In the retracted state, the table plate mechanism is folded, following the post link mechanism, in a bellows shape in a front view. In an expanded state of the table, the post link mechanism in the bellows shape is expanded in the plan view. In the expanded state, the table plate mechanism is horizontally expanded, following the post link mechanism.

According to the above configuration, when the table is stored, the support column and the table plate are folded into a bellows shape. For example, compared to a retractable type table in which only a table plate has a folded structure, the storage ability of the retractable table according to the present embodiment is improved.

In the above structure, a joint is configured to connect an upper end of the post and a valley portion of the table plate mechanism being in the retracted state. In the expanded state, joint portions of the pair of plate pieces are supported by an upper end of the post. The upper end of the post and a peak portion of the table plate mechanism in the retracted state are separated from each other.

According to the above configuration, in the retracted state, the peak portion of the table plate mechanism and the upper end of the support column are separated from each other. Therefore, when the table plate mechanism is folded, lifting of the support post is suppressed. Since the weight of the support column is not added, folding of the table plate mechanism can be smoothly performed.

In the above structure, a guide rail is configured to guide at least one post in the plurality of posts, wherein the at least one post is coupled to the table plate mechanism by the joint.

According to the above configuration, the expansion direction of the post link mechanism is defined by the guide rail.

In the above structure, the plurality of posts comprises at least one free post. The at least one free post is unconnected to the table plate mechanism. The at least one free post comprises a caster, a post body, and a biasing component; and the biasing component is configured to support the post body on the caster while upwardly biasing the post body.

When the table plate mechanism is expanded, the upper end of the free post is pressed against the plate piece of the table plate mechanism. According to the above configuration, the plate piece pushes down the post body to which the elastic force of the biasing component is applied. As a result, the lower end of the post body comes into contact with the floor surface. That is, the post body is used as a stopper.

In the above structure, the retractable table comprises at least one string component. The at least one string component is connected to a pair of links in the plurality of links, the pair of links being coupled to the post, and the at least one string component is configured to limit an expansion angle between the pair of links to an angle less than 180°.

According to the above configuration, the posts are restricted from being arranged in a straight line. This makes it possible for the post link mechanism to stably support the table plate mechanism.

The retractable table disclosed in the present specification can improve the storage performance as compared with the conventional one.

BRIEF DESCRIPTION OF DRAWINGS

The present disclosure will be further described with reference to the accompanying drawings, wherein like reference numerals refer to like parts in the several views, and wherein.

Figure 2:
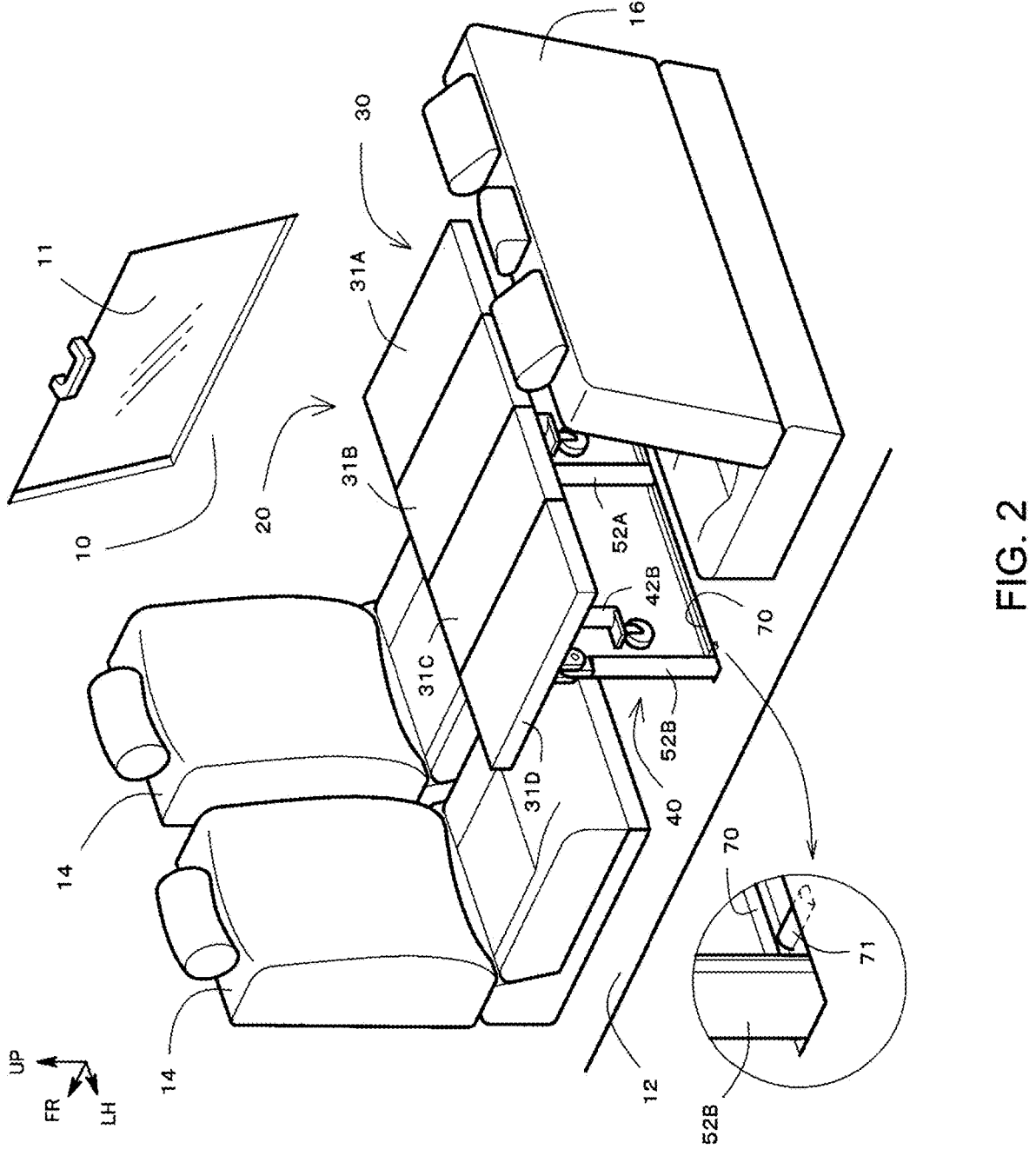

The perspective view of FIG. 2 illustrates the expanded state of the retractable table for vehicle.

Figure 3:
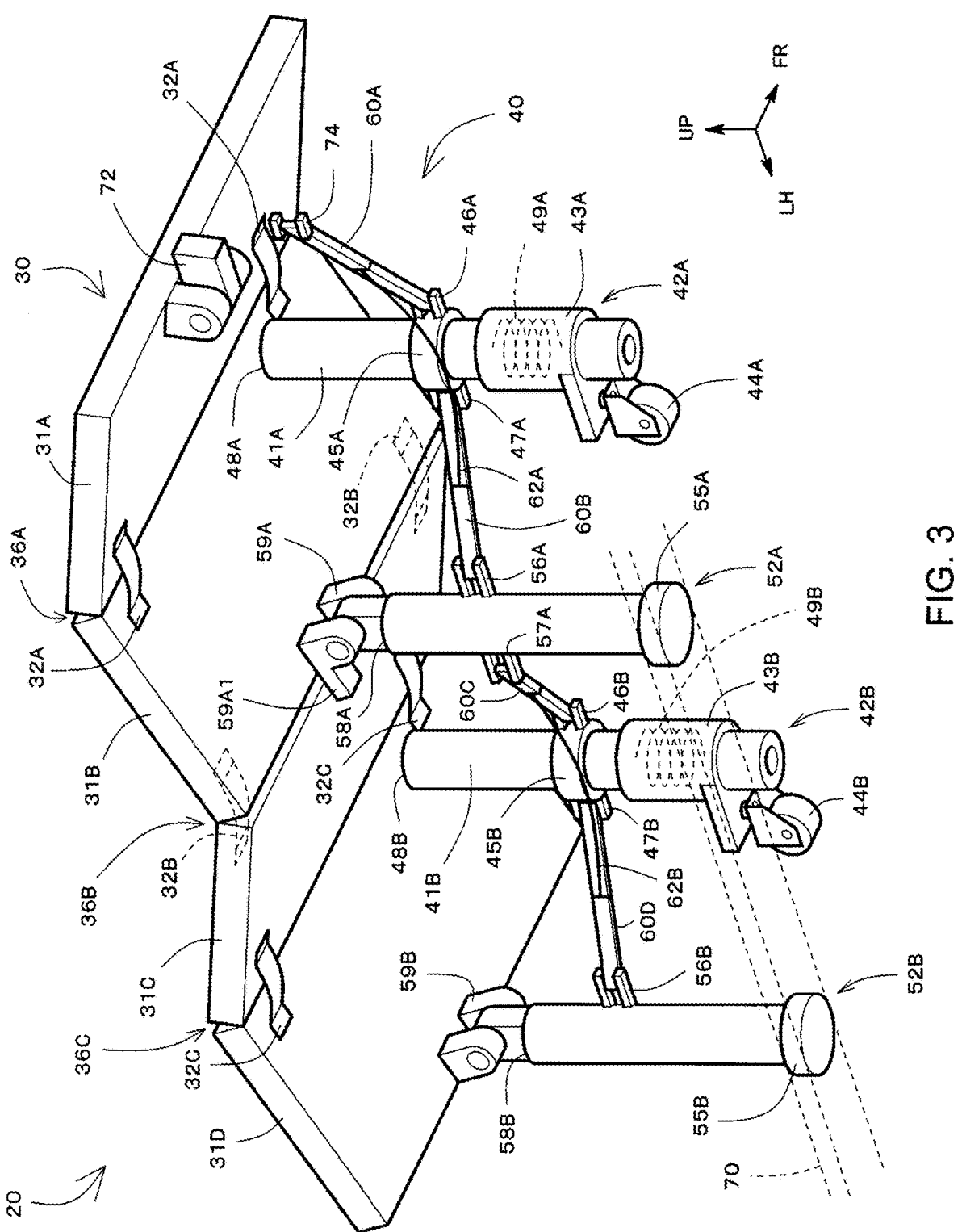

The perspective view of FIG. 3 illustrates the structure of the retractable table for vehicle.

Figure 4:
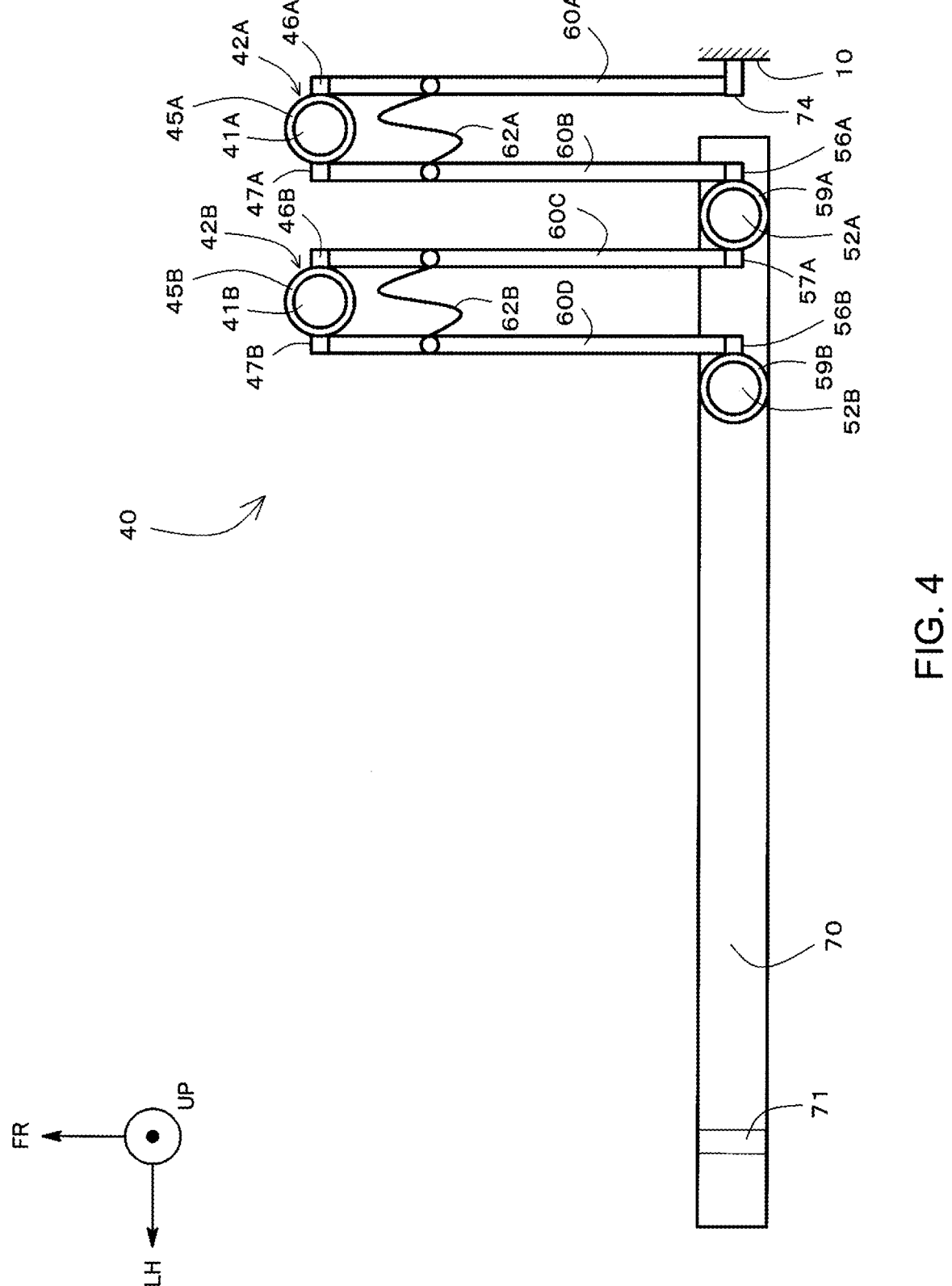

The plan view of FIG. 4 illustrates the retracted state of the post link mechanism.

Figure 5:
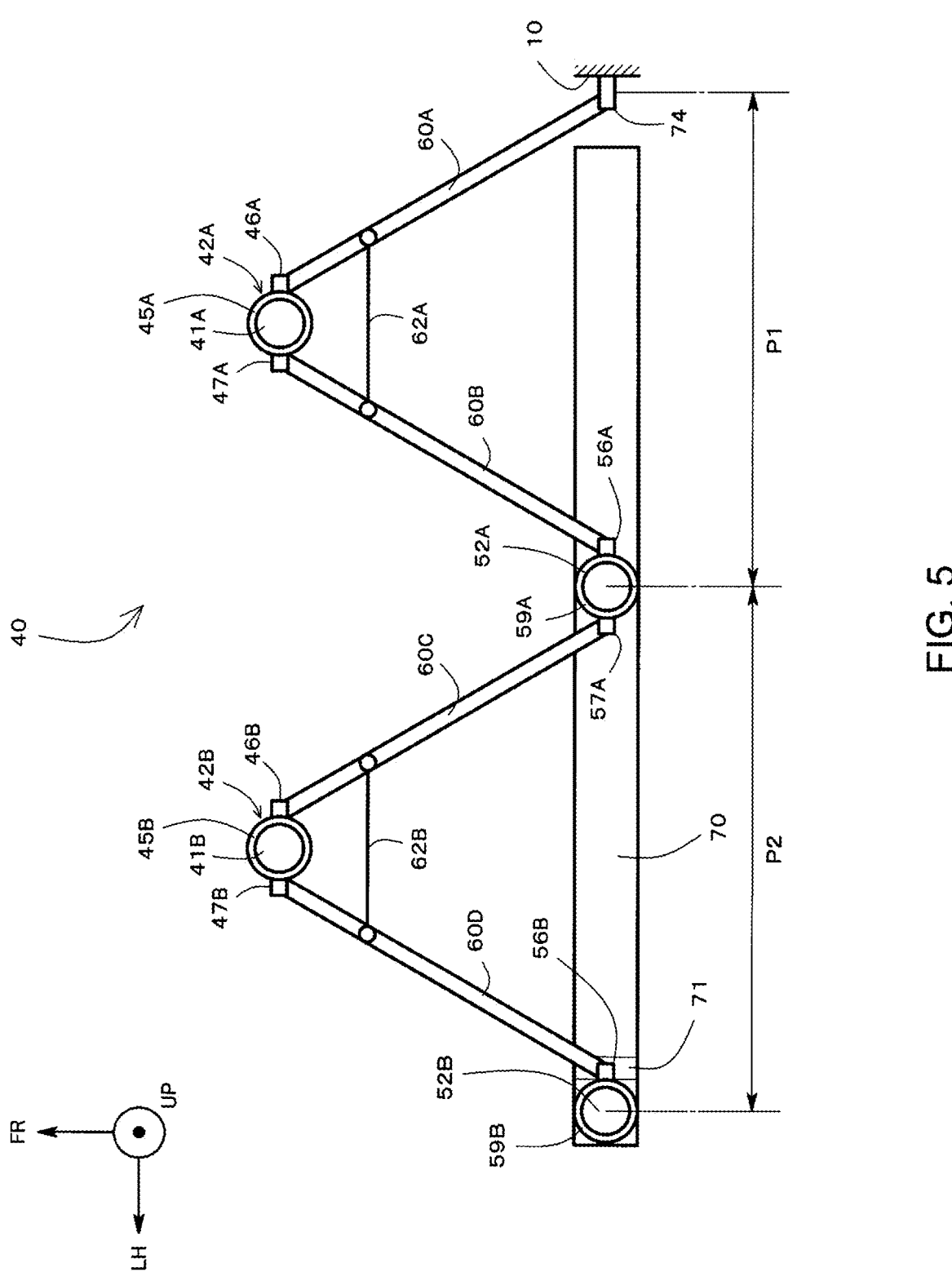

The plan view of FIG. 5 illustrates the expanded state of the post link mechanism.

Figure 6:
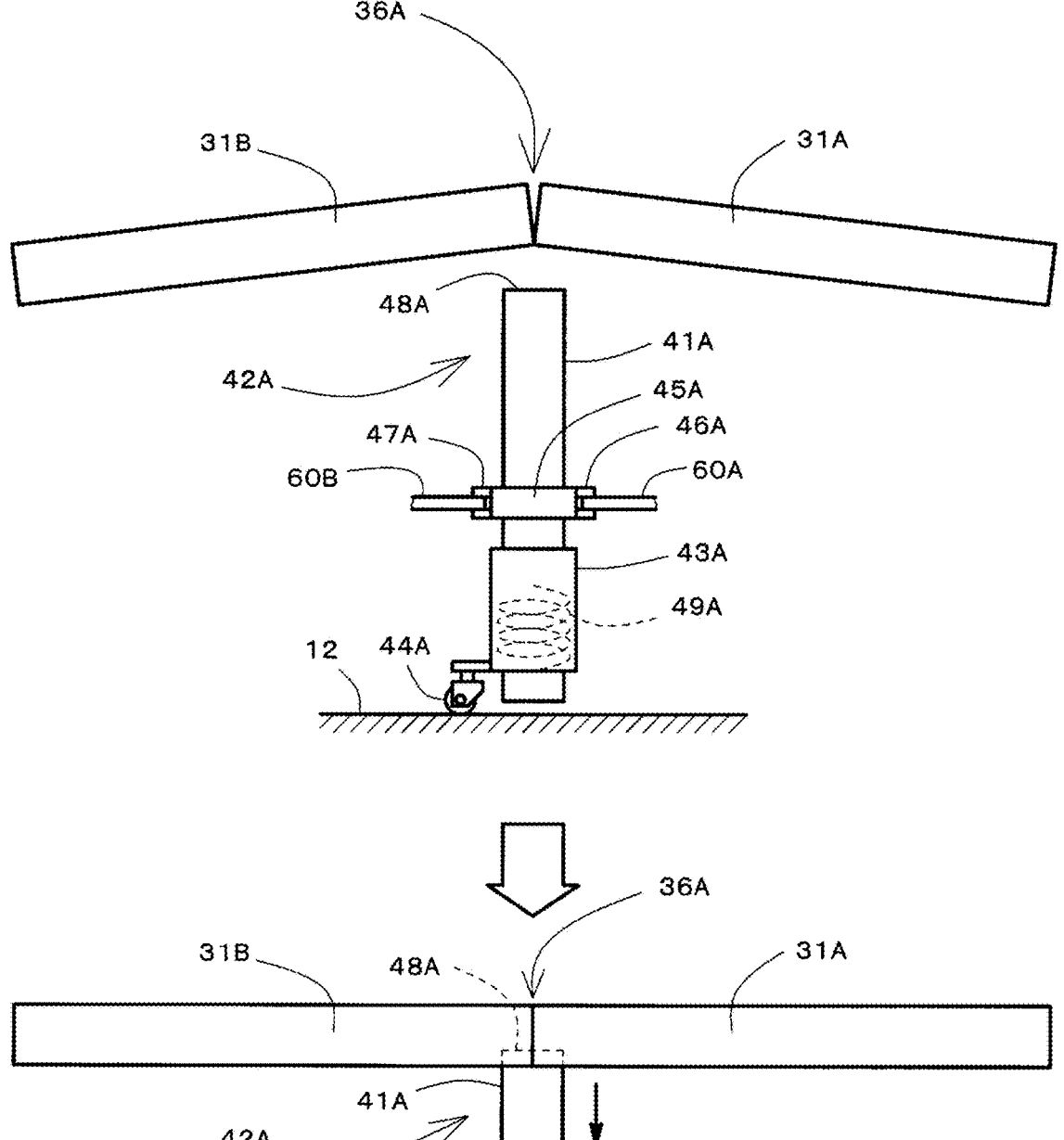

FIG. 6 is a front view illustrating the operation of the free post.

DESCRIPTION OF EMBODIMENTS

Hereinafter, a retractable table for vehicle according to the present embodiment will be described with reference to the drawings. The shapes, materials, numbers, and numerical values described below are examples for explanation. These examples can be appropriately changed according to the specifications of the retractable table for vehicle. In the following, the same reference numerals are given to the same elements in all the drawings.

In FIGS. 1 to 6, an orthogonal coordinate system is used to represent the position and direction of each component. The orthogonal coordinate system has an FR axis, an LH axis, and an UP axis. The FR axis is a vehicle longitudinal axis whose positive direction is the front of the vehicle. The LH axis is a vehicle width direction axis whose positive direction is the left side of the vehicle. The UP axis is a vertical axis of the vehicle in which the upward direction is a positive direction.

<Vehicle Interior Structure>

Figure 1:
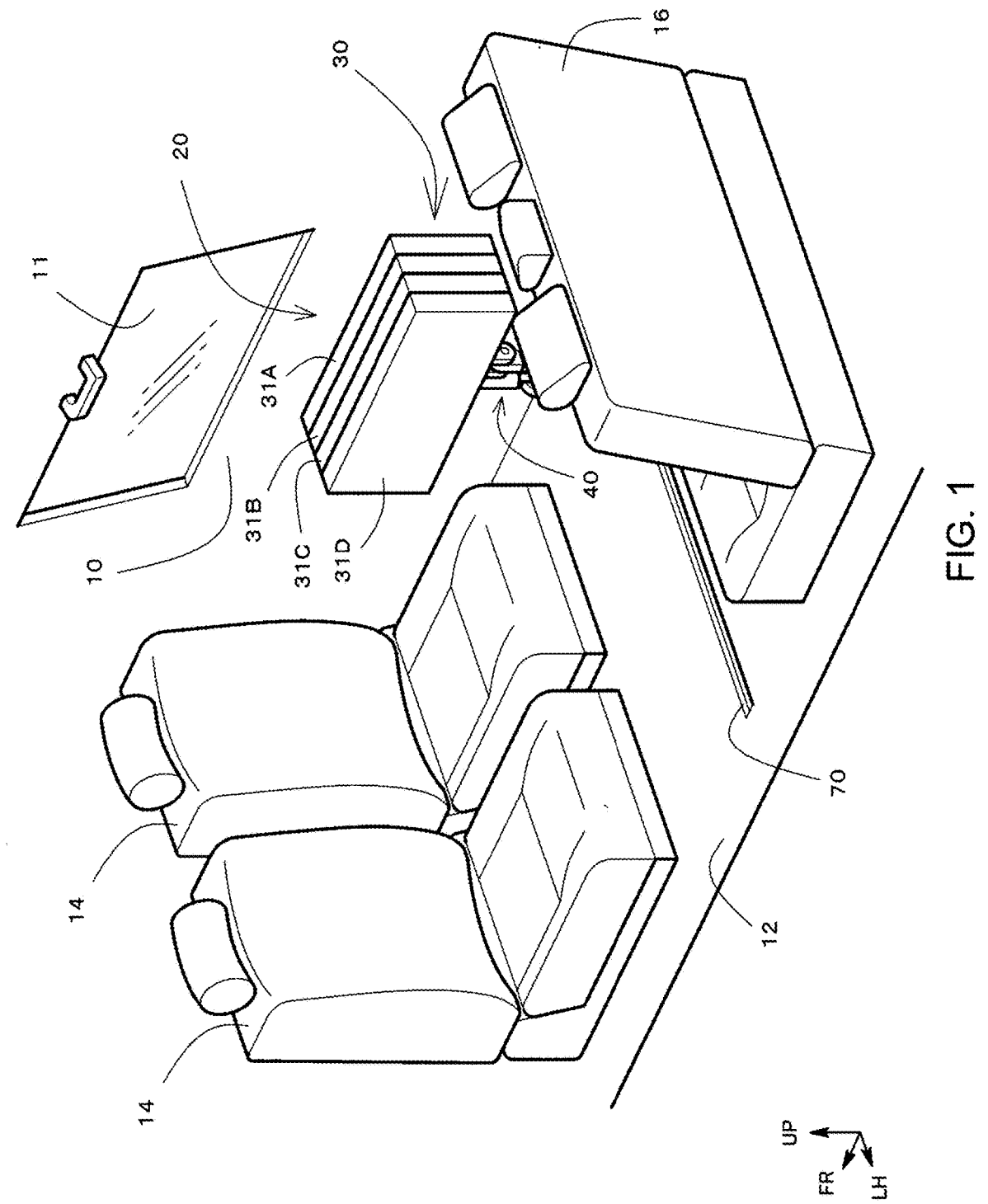
FIG. 1 is a perspective view illustrating a retracted state of the retractable table for vehicle.

FIG. 1 illustrates a structure of a vehicle compartment. A retractable table 20 is disposed in the vehicle compartment. In the example of FIG. 1, a door is disposed only on one side of the cabin. For example, as illustrated in FIG. 1, no door is provided on the right side of the cabin. A slide door, for example, is disposed on the left side of the cabin. A trim 10, which is an interior material, is disposed on a wall on the right side of the vehicle compartment.

A pair of separation sheets 14, 14 is disposed on the floor 12 as front sheets. The separation sheets 14, 14 are positioned so as to face rearward, for example.

A bench sheet 16 is disposed as a rear sheet on the floor 12. The bench sheet 16 is positioned to face forward, for example. That is, the pair of separation sheets 14, 14 and the bench sheet 16 face each other.

A retractable table 20 is arranged on the floor 12. The retractable table 20 is disposed between the pair of separation sheets 14, 14 and the bench sheet 16. As illustrated in FIGS. 1 and 2, the retractable table 20 is deformable between a retracted state (see FIG. 1) and an expanded state (see FIG. 2). In the retracted state, the retractable table 20 is folded on the trim 10 side. The retractable table 20 is expanded to the left in the vehicle width direction.

The retractable table 20 is disposed below the window 11 in the cabin. For example, when the plate pieces 31A to 31D are folded into a bellows shape, a predetermined distance is provided between the upper end of the plate pieces 31A to 31D and the lower end of the window 11. Thereby, even in the retracted state of the retractable table 20, the occupant can visually recognize the landscape outside the vehicle through the window 11.

A guide rail 70 is disposed on the floor 12. As described later, the retractable table 20 is developed while being guided by the guide rail 70. The floor 12 is, for example, a so-called flat floor having no step on the floor surface. When the floor 12 is a flat floor, the retractable table 20 can be smoothly expanded.

FIG. 3 is a perspective view of the retractable table 20. This figure is drawn with an angle looking up the retractable table 20 from below. FIG. 3 exemplifies the retractable table 20 during the transition from the retracted state to the expanded state. As will be described in detail below, the retractable table 20 includes a table plate mechanism 30, a post link mechanism 40, and guide rails 70.

<Table Plate Mechanism>

In the retracted state of the retractable table 20, the table plate mechanism 30 follows the post link mechanism 40. The table plate mechanism 30 is folded into a bellows shape in a front view (FR-axis view) (see FIG. 1). In the expanded state of the retractable table 20, the table plate mechanism 30 follows the post link mechanism 40. Then, the bellows-shaped table plate mechanism 30 in a front view is expanded (see FIG. 2).

As illustrated in FIG. 3, the table plate mechanism 30 includes a plurality of plate pieces 31A-31D, a plurality of hinge tapes 32A-32C, and a trim joint 72. In FIGS. 1 to 3, four plate pieces 31 are shown. However, the number of the plate pieces 31 can be increased or decreased according to the width (LH-axis dimension) of the plate pieces, the width of the vehicle compartment, and the like.

The plate pieces 31A to 31D are made of, for example, aluminum plates or resin plates. The plate pieces 31A to 31D are formed to have the same thickness, width, and length. The thickness indicates the UP-axis dimension. The width indicates the LH-axis dimension. Further, the length indicates the FR axis dimension.

Further, manufacturing tolerances are determined in manufacturing the plate pieces 31A to 31D. Even if there is a difference in the dimensions of the plate pieces 31A to 31D, if the difference is equal to or less than the manufacturing tolerance, the dimensions of the plate pieces 31A to 31D are regarded as being the same.

The hinge tapes 32A to 32C rotatably couple the plate pieces 31A to 31D. The expansion direction and the rotation axis of the plate pieces 31A to 31D are orthogonal to each other. For example, in the example of FIGS. 1-3, the rotation axis is parallel to the FR axis. The hinge tapes 32A to 32C have flexible base sheets, for example. The base sheet is, for example, a resin sheet. Further, an adhesive is applied to both ends of the base sheet.

The hinge tape 32A joins the pair of plate pieces 31A and 31B. The hinge tape 32B joins the pair of plate pieces 31B and 31C. The hinge tape 32C joins the pair of plate pieces 31C and 31D.

As illustrated in FIG. 1, the plate pieces 31A to 31D are folded in a bellows shape in a front view (FR-axis view) in the retracted state. As illustrated in FIG. 3, the hinge tapes 32A and 32C are disposed at the peak portions of the bellows shape. The hinge tapes 32A and 32C are attached to the lower surfaces of the plate pieces 31A to 31D. On the other hand, the hinge tape 32B is disposed in the valley portion of the bellows shape. The hinge tape 32B is attached to the upper surfaces of the plate pieces 31B and 31C.

By such sticking, when the plate pieces 31A to 31D are developed horizontally, the hinge tapes 32A to 32C are tensioned. By applying tension to the hinge tapes 32A to 32C, the horizontal state of the plate pieces 31A to 31D is maintained. Referring to FIG. 3, plate pieces 31A to 31D have joint portions 36A to 36C. The height of the joint portion 36B serving as the valley portion of the bellows shape does not change between the expanded state and the retracted state. The heights of the joint portions 36A and 36C, which are mountain portions of the bellows shape, change between the expanded state and the retracted state.

The trim joint 72 is attached to the lower end of the plate piece 31A closest to the trim 10 (see FIG. 1). The trim joint 72 has a rotating shaft. The rotation axis is orthogonal to the deployment direction. One end (an inner end in the vehicle width direction) of the trim joint 72 is connected to the plate piece 31A. The other end (outer end in the vehicle width direction) of the trim joint 72 is coupled to the trim 10 with the rotating shaft interposed therebetween.

<Post Link Mechanism>

When the retractable table 20 is in the retracted state, the post link mechanism 40 is folded into a bellows shape in a plan view (up-axis view) (see FIG. 4). When the retractable table 20 is in the expanded state, the post link mechanism 40 in a bellows shape in a plan view is expanded (see FIG. 5).

As illustrated in FIG. 3, the post link mechanism 40 includes free posts 42A, 42B, coupling posts 52A, 52B, links 60A-60D, table joints 59A, 59B, string component 62A, 62B, and trim joint 74.

When the retractable table 20 is in the expanded state, the plate pieces 31A to 31D are supported by the coupling posts 52A and 52B and the free posts 42A and 42B. Specifically, the joint portions 36B, 36A, 36C of the plate pieces 31A-31D are supported by the upper ends 58A, 48A, 48B of the coupling post 52A and the free post 42A, 42B. By supporting the joint portions 36A to 36C, the plate pieces 31A to 31D in the expanded state can be prevented from being bent downward from the horizontal state.

The coupling posts 52A and 52B are, for example, cylindrical parts. Table joints 59A and 59B are coupled to upper ends 58A and 58B of the coupling posts 52A and 52B, respectively. Sliders 55A and 55B are arranged at the lower ends of the coupling posts 52A and 52B.

The coupling post 52A is positioned immediately below the joint portion 36B of the plate pieces 31B and 31C. For example, the coupling post 52A is positioned such that the cross-sectional circle of the coupling post 52A and the joint portion 36B partially overlap each other in a plan view. By such a positioning, the joint portion 36B is supported on the upper end 58A of the coupling post 52A.

More specifically, joint portion 36B is supported on the upper end 58A of coupling post 52A via table joint 59A. The table joint 59A is coupled to the plate piece 31B and the coupling post 52A. The table joint 59A and the table joint 59B have rotation shafts. The rotation axis is orthogonal to the expansion direction of the retractable table 20. For example, the rotation axis is parallel to the FR axis.

One end of the table joint 59A is coupled to the upper end 58A of the coupling post 52A. Further, the other end of the table joint 59A is coupled to the lower surface of the plate piece 31B with the rotating shaft interposed therebetween.

The joint portion to the plate piece 31B is defined by the joint portion 36B of the plate pieces 31B and 31C. For example, the table joint 59A is coupled to an end portion of the plate piece 31B on the side of the plate piece 31C in the vehicle width direction. The table joint 59A has a support protrusion 59A1. The support protrusion 59A1 extends toward the plate piece 31C. With this configuration, the plate pieces 31B and 31C are supported by the upper end 58A of the coupling post 52A via the table joint 59A.

As illustrated in FIG. 3, the joint portion 36B becomes a bellows-shaped valley portion when the retractable table 20 is folded. The height position of the valley portion does not substantially change during deployment and storage. Since the table joint 59A is coupled to the valley portion, when the plate pieces 31A to 31D are folded into a bellows shape, the coupling post 52A is prevented from being lifted.

The table joint 59B is coupled to the plate piece 31D and the coupling post 52B. One end of the table joint 59B is coupled to the upper end 58B of the coupling post 52B. Further, the other end of the table joint 59B is coupled to the lower surface of the plate piece 31D with the rotating shaft interposed therebetween. For example, a table joint 59B is coupled to the left end of the plate piece 31D in the vehicle width direction.

In this way, the plate pieces 31B and 31D and the coupling posts 52A and 52B are coupled via the table joints 59A and 59B. As a result, the post link mechanism 40 and the table plate mechanism 30 can transition to the retracted state and the expanded state in conjunction with each other.

For example, the diameters of the sliders 55A and 55B are larger than those of the main body portions of the coupling posts 52A and 52B. The sliders 55A and 55B slide in the guide rail 70. Referring to FIGS. 1 to 3, a guide rail 70 is disposed on the floor 12. The guide rail 70 extends linearly in the vehicle width direction, for example. That is, the sliders 55A and 55B linearly move in the vehicle width direction while being guided by the guide rail 70. The guide rail 70 regulates the movement direction of the sliders 55A and 55B. Thus, the retractable table 20 can be developed in an intended direction.

As illustrated in FIG. 3, the link joints 56A, 56B, and 57A are disposed on the outer peripheral surfaces of the coupling posts 52A and 52B. The link joints 56A and 56B extend from the outer peripheral surfaces of the coupling posts 52A and 52B in the negative direction of the LH axis. The link joint 57A extends from the outer peripheral surface of the coupling post 52A in the positive direction of the LH axis. End portions of the links 60B to 60D are coupled to the link joints 56A, 56B, and 57A. The links 60B-60D are rotatable with respect to the link joints 56A, 56B, 57A.

The free posts 42A, 42B are uncoupled from the table plate mechanism 30. The free posts 42A and 42B have post bodies 41A and 41B, sleeve 43A, 43B, 45A and 45B, casters 44A and 44B, and biasing components 49A and 49B.

The upper ends 48A and 48B of the post bodies 41A and 41B are not joined to the plate pieces 31A to 31D. For example, when the plate pieces 31A to 31D are folded into a bellows shape, the upper ends 48A and 48B of the post bodies 41A and 41B are separated from the plate pieces 31A to 31D.

In the expanded state of the retractable table 20, the upper ends 48A and 48B of the post bodies 41A and 41B support the joint portions 36A and 36C of the plate pieces 31A to 31D. Plates (not shown) having a larger diameter than the post bodies 41A and 41B may be disposed at the upper ends 48A and 48B. The plate more surely supports the joint portions 36A, 36C.

As illustrated in FIG. 3, in the retracted state, the joint portions 36A and 36C become peak portions of the bellows-shape when the retractable table 20 is folded. Since the peak portions of the bellows-shape and the upper ends 48A and 48B of the post bodies 41A and 41B are uncoupled, lifting of the free posts 42A and 42B is avoided when the plate pieces 31A to 31D are folded. Since the weight of the free posts 42A and 42B is not added, the plate pieces 31A to 31D can be folded smoothly.

A link joint 46A, 46B, 47A and 47B is disposed on the outer peripheral surface of the sleeves 45A and 45B. The link joints 46A and 46B extend from the outer peripheral surfaces of the sleeves 45A and 45B in the negative direction of the LH axis. The link joints 47A and 47B extend from the outer peripheral surfaces of the sleeves 45A and 45B in the positive direction of the LH axis. End portions of links 60A-60D are coupled to link joint 46A, 46B, 47A and 47B. Links 60A-60D are pivotable with respect to link joint 46A, 46B, 47A and 47B.

The sleeves 45A and 45B are vertically slidable with respect to the post bodies 41A and 41B. As will be described later, when the retractable table 20 is expanded, the post bodies 41A and 41B are pressed by the plate pieces 31A to 31D. At this time, the post bodies 41A and 41B slide with respect to the sleeves 45A and 45B. Thereby, the height positions of the sleeves 45A and 45B are maintained.

Further, the lower portions of the post bodies 41A and 41B are inserted into the sleeves 43A and 43B. Casters 44A and 44B are attached to the sleeves 43A and 43B. The casters 44A and 44B allow the free posts 42A and 42B to move in the vehicle width direction and the front-rear direction.

The sleeves 43A and 43B are coupled to the post bodies 41A and 41B via the biasing components 49A and 49B. The biasing components 49A and 49B support the post bodies 41A and 41B in a state in which the post bodies 41A and 41B are biased upward with respect to the casters 44A and 44B. The biasing components 49A and 49B are, for example, coil springs. The upper ends of the coil springs are coupled to the post bodies 41A and 41B. The lower end of the coil spring is coupled to the sleeves 43A and 43B.

The links 60A to 60D are bar-shaped parts. Joints are provided at both ends of the links 60A-60D. Link 60A couples trim 10 and free posts 42A. Link 60B couples free posts 42A and coupling posts 52A. The link 60C couples the coupling posts 52A and the free posts 42B. Link 60D couples free posts 42B and coupling posts 52B.

More specifically, one end of link 60A is rotatably coupled to trim joint 74 and link joint 46A. The other end of the trim joint 74 is coupled to the trim 10 (see FIG. 1). The link 60B is rotatably coupled to the link joints 47A and 56A. The link 60C is rotatably coupled to the link joints 57A and 46B. The link 60D is rotatably coupled to the link joints 47B and 56B. The rotation axes of the links 60A to 60D are parallel to the UP axis.

A string component 62A is coupled to the links 60A and 60B coupled to the free post 42A. Similarly, a string component 62B is connected to the links 60C and 60D connected to the free post 42B. The string components 62A and 62B may be a string made of a fiber material, for example. The string components 62A and 62B may be metal chains, for example.

As illustrated in FIG. 5, the string components 62A and 62B regulate the deployment angles of the links 60A and 60B and the links 60C and 60D. Specifically, the lengths of the string components 62A and 62B are determined such that the expansion angles of the links 60A and 60B and the links 60C and 60D are less than 180°.

By regulating the expansion angle of the links 60A to 60D to less than 180°, it is possible to avoid that the free posts 42A and 42B and the coupling posts 52A and 52B are arranged linearly. In other words, in the expanded state, the free posts 42A and 42B and the coupling posts 52A and 52B are staggered. This makes it possible for the post link mechanism 40 to stably support the table plate mechanism 30.

Further, the string components 62A and 62B define expansion pitches P1 and P2 (see FIG. 5) of the free posts 42A and 42B and the coupling posts 52A and 52B at the time of deployment. The expansion pitches P1 and P2 indicate separation distances in the expansion direction (LH-axis direction).

For example, the length and installation location of the string component 62A are determined such that the pitch P1 between the trim 10 and the coupling post 52A is equal to the sum of the vehicle width dimensions of the plate piece 31A and the plate piece 31B (see FIG. 3). Similarly, the length and installation location of the string component 62B are determined such that the pitch P2 between the coupling posts 52A and 52B is equal to the sum of the vehicle width dimensions of the plate pieces 31C and 31D.

<Operation During Deployment>

FIG. 4 illustrates the post link mechanism 40 in a retracted state. FIG. 5 illustrates the post link mechanism 40 in the expanded state. When deploying the retractable table 20, for example, an occupant of the vehicle pulls the coupling post 52B to the left in the vehicle width direction. In order to improve the efficiency of the deployment operation, a handle may be provided on the coupling post 52B.

The coupling post 52B linearly moves in the vehicle width direction along the guide rail 70. In conjunction therewith, the plate piece 31D (see FIG. 3) coupled to the coupling post 52B is pulled to the left in the vehicle width direction. Further, when the coupling post 52B is pulled to the left in the vehicle width direction, the post link mechanism 40 deploys as illustrated in FIG. 5. The post link mechanism 40 is expanded until the string components 62A and 62B are pulled in the vehicle width direction. For example, the string components 62A and 62B are pulled in the vehicle width direction at a position where the coupling post 52B rides over the stopper 71 of the guide rail 70. For example, the stopper 71 is formed of an elastic member such as rubber.

The table plate mechanism 30 (see FIG. 3) is expanded following the deployment of the post link mechanism 40. The plate pieces 31B and 31D are pulled to the left in the vehicle width direction by the coupling posts 52A and 52B. By this pulling, the plate pieces 31A to 31D folded in a bellows shape as shown in FIG. 1 are expanded as shown in FIG. 2.

When the plate pieces 31A to 31D are expanded, the plate pieces 31A to 31D push down the upper ends 48A and 48B of the free posts 42A and 42B. For example, as illustrated in FIG. 6, the free post 42A is positioned immediately below the joint portion 36A of the expanded plate pieces 31A and 31B. The upper end 48A of the free post 42A, which is in contact with the plate pieces 31A and 31B, is pressed by the plate pieces 31A and 31B. At this time, the post body 41A biased by the biasing component 49A is pressed down. Further, as illustrated in the lower part of FIG. 6, the lower end of the post body 41A abuts against the floor 12. Thus, the movement of the free post 42A is regulated by the post body 41A functioning as a stopper.

<Another Example of the Storage Expression Table>

In the retractable table 20 described above, the right end portion in the vehicle width direction is connected to the trim 10. However, the retractable table 20 according to the present embodiment is not limited to such a configuration. For example, additional coupling posts may be provided closer to the trim 10 than the free posts 42A. This additional coupling posts are linked to free posts 42A.

The additional coupling posts may be secured to the floor 12. Alternatively, the additional coupling posts may be slidably movable on the guide rail 70. In this case, for example, the retractable table 20 can be developed only on the left side, and the right side portion can be folded to the left side.

The present disclosure is not limited to the present embodiments described above, and includes all changes and modifications without departing from the technical scope or the essence of the present disclosure defined by the claims.

The invention claimed is:

1. A table for a vehicle, the table being retractable, comprising;

a post link mechanism including a plurality of posts and a plurality of links; and a table plate mechanism including a plurality of plate pieces and a plurality of hinges;

wherein each of the plurality of links connects a pair of posts in the plurality of posts;

each of the plurality of hinges connects a pair of plate pieces in the plurality of plate pieces;

in a retracted state of the table, the post link mechanism is folded into a bellows shape in a plan view;

in the retracted state, the table plate mechanism is folded, following the post link mechanism, in a bellows shape in a front view;

in an expanded state of the table, the post link mechanism in the bellows shape is expanded in the plan view; and in the expanded state, the table plate mechanism is horizontally expanded, following the post link mechanism, wherein the plurality of posts comprises at least one free post;

the at least one free post is unconnected to the table plate mechanism;

the at least one free post comprises a caster, a post body, and a biasing component; and the biasing component is configured to support the post body on the caster while upwardly biasing the post body.

2. The table for a vehicle according to claim 1, further comprising;

a joint configured to connect an upper end of the post and a valley portion of the table plate mechanism being in the retracted state; wherein in the expanded state, joint portions of the pair of plate pieces are supported by an upper end of the post; and the upper end of the post and a peak portion of the table plate mechanism in the retracted state are separated from each other.

3. The table for a vehicle according to claim 2, further comprising;

a guide rail configured to guide at least one post in the plurality of posts, wherein the at least one post is coupled to the table plate mechanism by the joint.

4. A table for a vehicle, the table being retractable, comprising;

a post link mechanism including a plurality of posts and a plurality of links; and a table plate mechanism including a plurality of plate pieces and a plurality of hinges;

wherein each of the plurality of links connects a pair of posts in the plurality of posts;

each of the plurality of hinges connects a pair of plate pieces in the plurality of plate pieces;

in a retracted state of the table, the post link mechanism is folded into a bellows shape in a plan view;

in the retracted state, the table plate mechanism is folded, following the post link mechanism, in a bellows shape in a front view;

in an expanded state of the table, the post link mechanism in the bellows shape is expanded in the plan view;

in the expanded state, the table plate mechanism is horizontally expanded, following the post link mechanism;

at least one string component; wherein the at least one string component is connected to a pair of links in the plurality of links, the pair of links being coupled to the post, and the at least one string component is configured to limit an expansion angle between the pair of links to an angle less than 180°.

5. The table for a vehicle according to claim 4, further comprising;

a joint configured to connect an upper end of the post and a valley portion of the table plate mechanism being in the retracted state; wherein in the expanded state, joint portions of the pair of plate pieces are supported by an upper end of the post; and the upper end of the post and a peak portion of the table plate mechanism in the retracted state are separated from each other.

6. The table for a vehicle according to claim 5, further comprising;

a guide rail configured to guide at least one post in the plurality of posts, wherein the at least one post is coupled to the table plate mechanism by the joint.

* * * * *